United States Patent [19]

Skjaeveland

[11] Patent Number: 5,443,126
[45] Date of Patent: Aug. 22, 1995

[54] GRUBBER TINE

[75] Inventor: Magne Skjaeveland, Klepp St., Norway

[73] Assignee: Kverneland Klepp AS, Kvernaland, Norway

[21] Appl. No.: 92,467

[22] Filed: Jul. 16, 1993

[30] Foreign Application Priority Data

Jul. 17, 1992 [NO] Norway .................... 922832

[51] Int. Cl.6 .................. A01B 3/00; E02F 5/02
[52] U.S. Cl. ......................... 172/271; 172/265; 172/705; 172/720; 172/765; 403/367; 403/372
[58] Field of Search ........... 172/765, 720, 705, 271, 172/264, 265, 266, 267, 268; 403/372, 367, 365

[56] References Cited

U.S. PATENT DOCUMENTS

| | | | |
|---|---|---|---|
| 1,010,776 | 12/1911 | Langenfeld | 172/265 |
| 1,635,442 | 7/1927 | Sigurd | 172/271 |
| 1,982,862 | 12/1934 | Erdman | 172/271 |
| 2,381,973 | 8/1945 | Ego | 172/271 |
| 2,673,510 | 3/1954 | Bailey | 172/271 X |
| 3,010,744 | 11/1961 | Hollis | 172/271 X |
| 3,450,212 | 6/1969 | Sylvester | 172/271 X |
| 4,143,718 | 3/1979 | Quanbeck | 172/705 |
| 4,177,865 | 12/1979 | Lewison | 172/705 |
| 4,293,043 | 10/1981 | Neukom et al. | 172/267 |
| 4,532,790 | 8/1985 | Nicholls | 172/266 |

FOREIGN PATENT DOCUMENTS

| | | | |
|---|---|---|---|
| 2498875 | 8/1982 | France . | |
| 2605482 | 4/1988 | France . | |
| 1359652 | 7/1974 | Germany | 172/271 |
| 2910621 | 9/1980 | Germany . | |
| 2161053 | 1/1986 | United Kingdom . | |
| 9003722 | 4/1990 | WIPO . | |

OTHER PUBLICATIONS

Glencoe "Soil Saver" Shank Mounting Conversion Brochure Sep. 1972.

Primary Examiner—Dave W. Arola
Assistant Examiner—Christopher J. Novosad
Attorney, Agent, or Firm—Foley & Lardner

[57] ABSTRACT

The invention relates to a grubber tine of a tubular cross-section which, as compared to known grubber tines, give reduced weight and larger flexure and vibrations when moved through the soil, which gives reduced tractive power. The grubber tine is adapted to escape obstacles within the soil in that the grubber tine is pivotally suspended on a shaft. Bosses are attached to the grubber tine through friction forces between the bosses and the grubber tine at a preferably conical contact face, achieved in that the bosses are pressed into holes in the wall of the grubber tine. In the working position, the grubber tine rests against a shaft and is kept in place by means of a safety bolt adapted to be stretched off upon the occurrence of overload. The safety bolt may be combined with a resilient member, such that the grubber tine to a certain degree may yield upon load and then return to working position. Alternatively, the safety bolt may be completely substituted by a biased spring allowing the grubber tine to rotate around the shaft, thus escaping obstacles and passing over possible obstacles, thereafter returning to working position by means of the spring force.

9 Claims, 5 Drawing Sheets

GRUBBER TINE

BACKGROUND OF THE INVENTION

This invention relates to a grubber tine.

Known grubber tines are made of solid steel. Disadvantages of these are that each individual tine represents a large consumption of material; it is heavy, it is rigid and, consequently, it vibrates little when it is carried through the soil.

SUMMARY OF THE INVENTION

An object of the invention is to provide a grubber tine representing a substantially smaller consumption of material than previously known, causing the grubber tine according to the invention to be much lighter in weight than prior art grubber tines.

Another object of the invention is to provide a grubber tine which in use is less rigid than known grubber tines and which, therefore, may yield somewhat when it strikes against major resistance in the soil, resulting in an increased vibration of the grubber tine according to the invention as compared to prior art grubber tines; it may, therefore, work itself easier through the soil, which is tantamount to less tractive power.

In accordance with the invention, the objects are achieved by means of the features appearing in the appended claims.

BRIEF DESCRIPTION OF THE DRAWINGS

Three embodiments are shown in the attached drawings. In all three embodiments, the upper portion of the grubber tine is supported between two plates which form part of the grubber frame, and a pointed piece attached to the lower portion of the grubber tine works the soil.

DETAILED DESCRIPTION OF THE PREFERRED EMBODIMENTS

Figure 1:
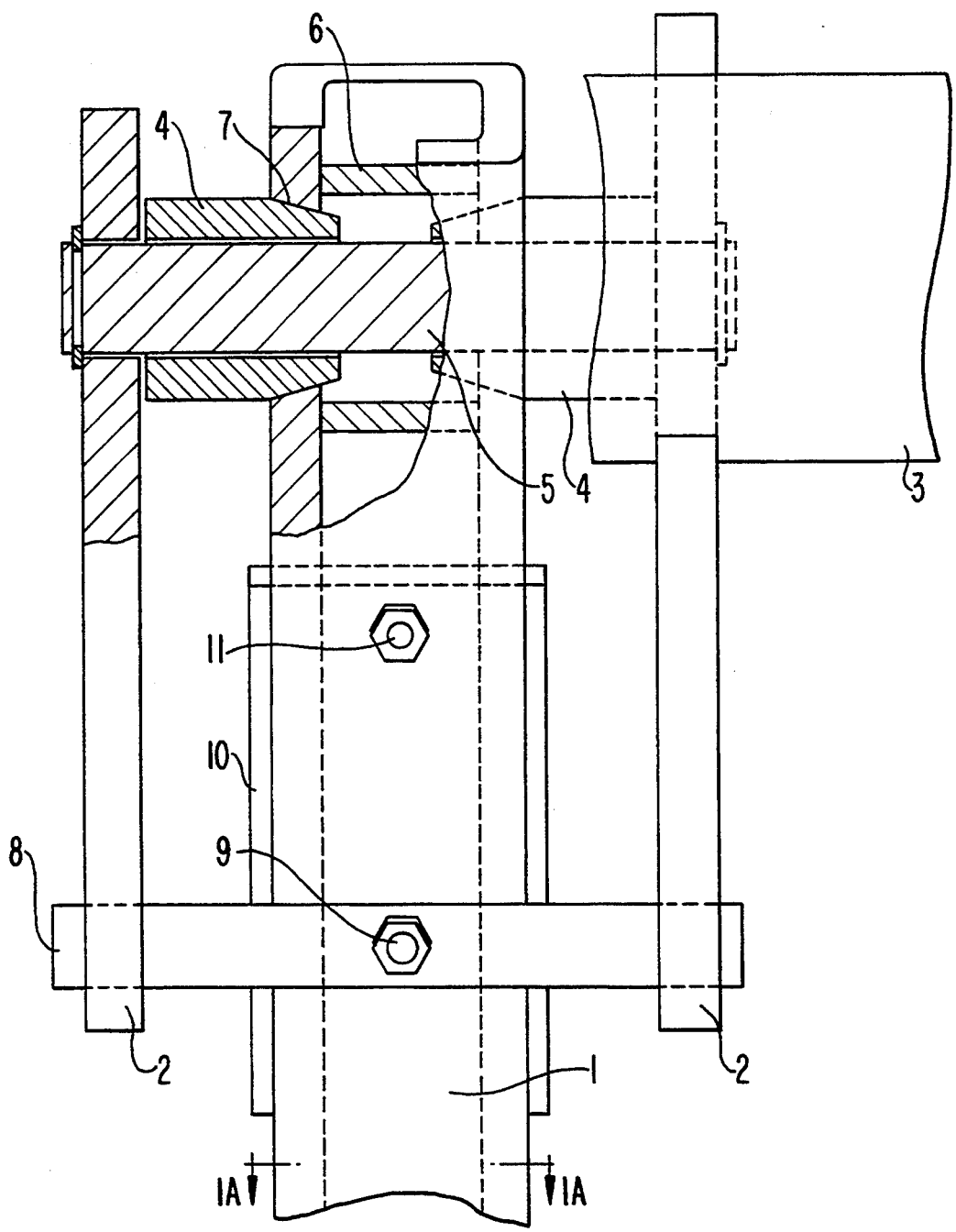
FIG. 1 shows an upper portion of a grubber tine and the suspension thereof, seen from in front and partly in section.
Figure 1A:
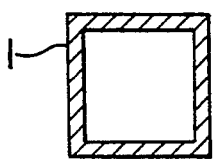
FIG. 1A shows a cross section view of body portion of a grubber tine taken along the line IA—IA in FIG. 1.

In the drawings, reference numeral 1 denotes a grubber tine pivotally suspended between two plates 2 which, on their part, are rigidly anchored to a frame 3. The grubber tine 1 is hollow and, preferably, made of square pipe, resulting in a resilient grubber tine having good structural strength and low weight.

The grubber tine 1 is attached to bosses 4 serving as plain bearing against a shaft 5 attached to the plates 2, whereby the grubber tine 1 may be rotated around the shaft 5.

Each boss 4 is attached to the grubber tine 1 through being pressed into a hole in the wall of the grubber tine 1, which is supported by means of a spacer sleeve 6. Elastic material deformation in a preferably conical contact face 7 between boss 4 and grubber tine 1 gives friction and adequate attachment for the bosses 4 by attaching the bosses 4 to the grubber tine 1 in this way, structural strength is maintained, in that tension concentrations normally linked to other methods of attachment are avoided.

Figure 2:
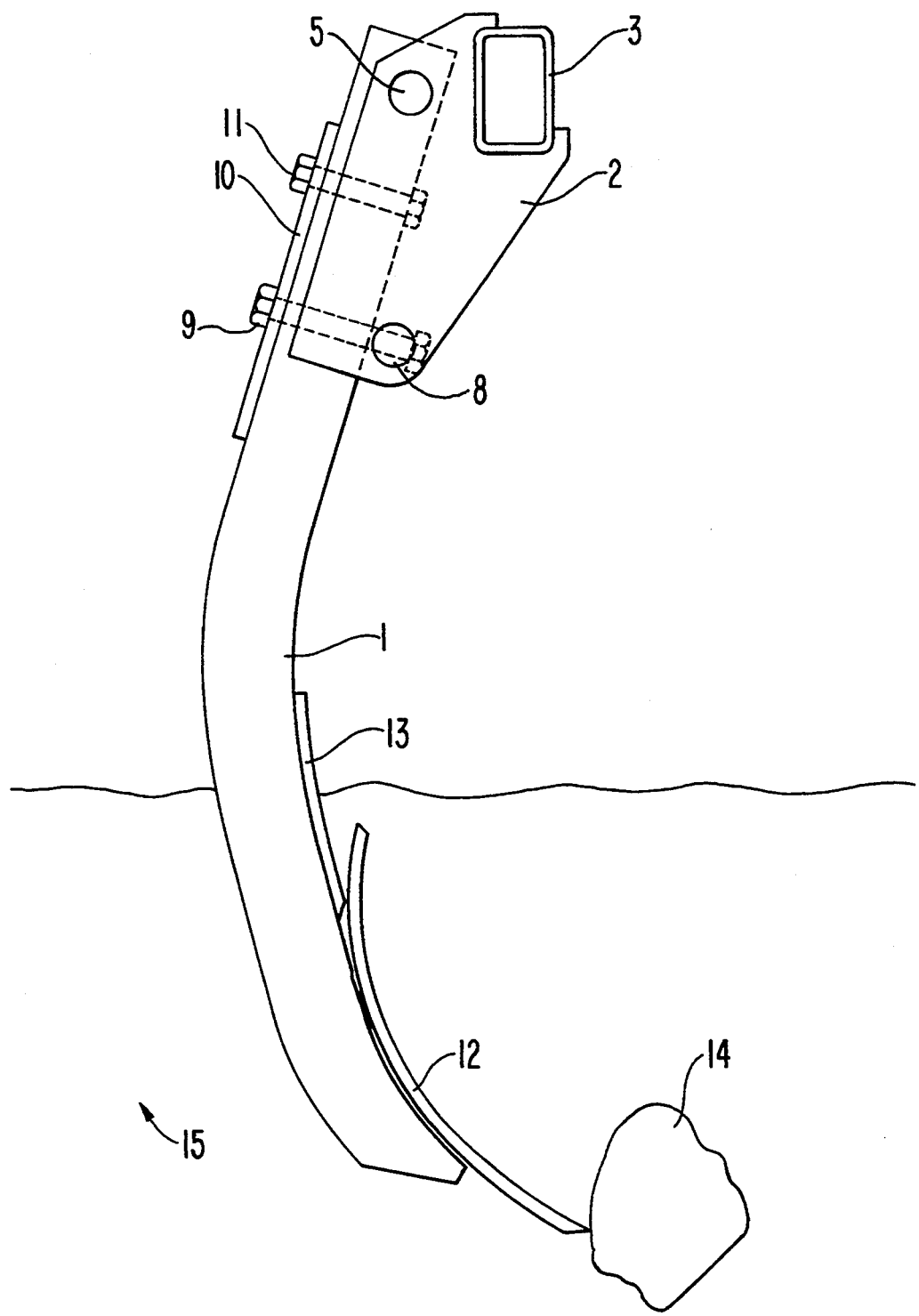
FIG. 2 shows, on a smaller scale and in a side elevational view, a first variant of a suspended grubber tine.

In a first embodiment, the grubber tine 1 is maintained in a working position by means of a shaft 8 attached to the plates 2, and a lateral safety bolt 9 passing through the shaft 8, the bolt 9 being adapted to be torn off upon a predetermined tensile load. Reference is made to FIGS. 1 and 2. When the security bolt 9 is tightened and, thus, biased, the grubber tine 1 is retained resting firmly against the shaft 8 and is, therefore, prevented from rotating around the shaft 5. A strengthening plate 10 is kept in place on the rear side of the grubber tine 1 by means of a screw 11 and serves simultaneously as base and abutment for the security bolt 9. Further, the grubber tine 1 is provided with a pointed piece 12 working the soil and one or more wear plates 13 protecting the grubber tine against wear and tear. Varying resistance within the soil gives vibrations and resilient bendings and flexures of the grubber tine 1, which is desired due to the act that such movements of the grubber tine 1 reduces the necessary tractive power. If the resistance offered in the soil becomes too large, for example, if the grubber tine strikes against solid ground or a larger stone 14, the safety bolt 9 is torn off, and the grubber tine 1 is rotated around the shaft 5, as shown by an arrow 15 in FIG. 2, and moves clear of the obstacle, whereby damage to the grubber tine 1 or other parts of the implement is avoided. If the safety bolt 9 is torn off, a new and undamaged safety bolt 9 has to be mounted prior to the continuation of working the soil.

Figure 3:
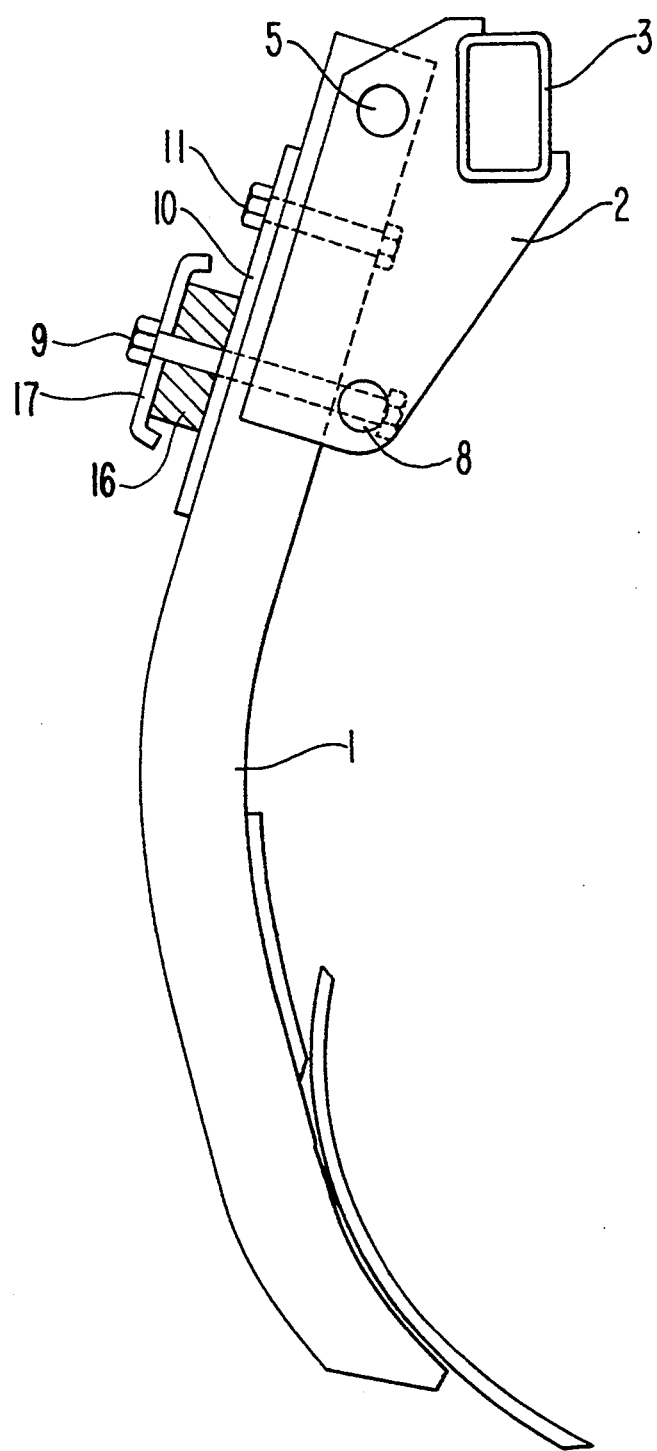
FIG. 3 shows, in a side elevational view, a second variant of a suspended grubber tine having a damper.
Figure 4:
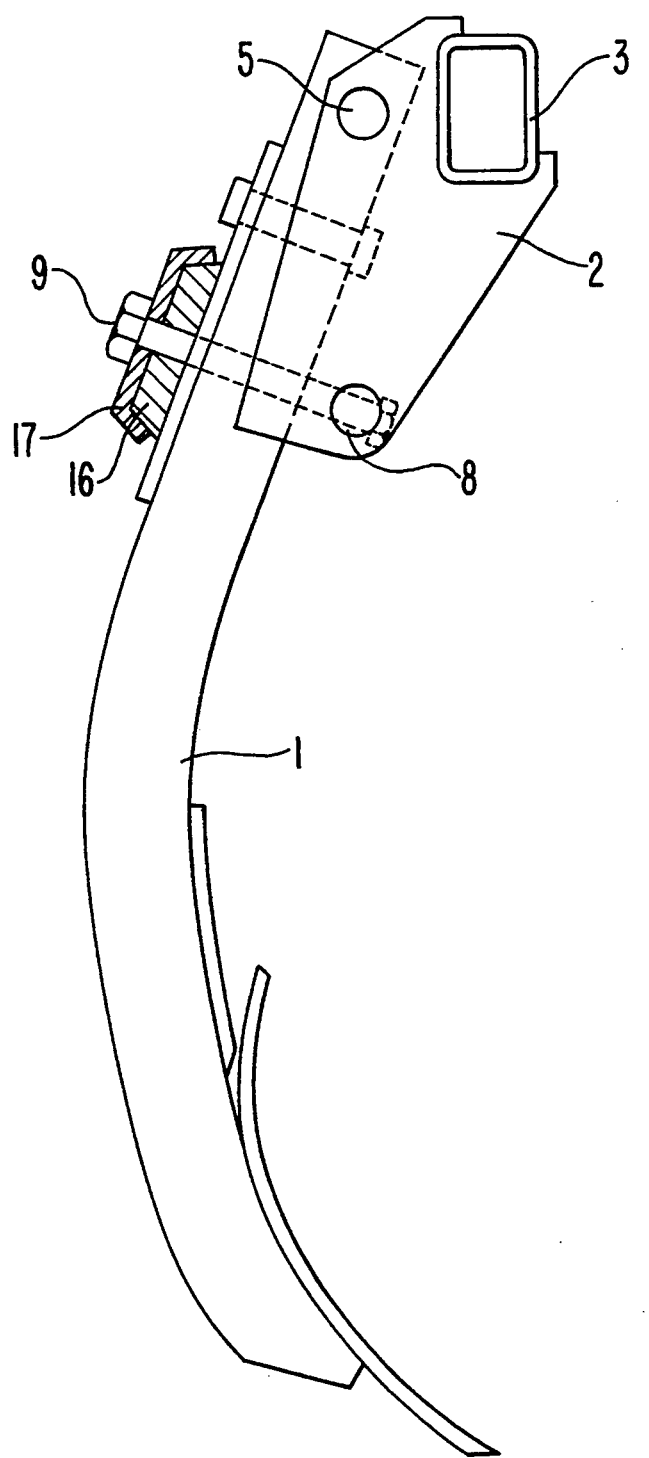
FIG. 4 shows the same embodiment as in FIG. 3, but the damper has here become operative.

A second embodiment of the grubber tine 1 is shown in FIG. 3, wherein the tensile force of the safety bolt 9 is transferred to the grubber tine 1 through a resilient body 16. As resilient body 16 is, preferably, a rubber cleat having a support plate 17. However, other prior art spring types may, of course, be used. Such a resilient body 16 allows an increased movement of the grubber tine 1 and, thus, reduces further the necessary tractive power. Moreover, the vibrations of the grubber tine 1 are transferred to the frame 3 in less degree. FIG. 4 shows a grubber tine 1 wherein the resilient body 16 is deformed in that the grubber tine 1 has rotated around the shaft in relation to the plates 2 and the frame 3. Due to the fact that the shaft 8 is rotatable in relation to the plates, the safety bolt 9 is allowed to take a direction, in which the safety bolt substantially is subjected to tensile forces as the grubber tine 1 rotates around the shaft 5. If the grubber tine 1 is loaded beyond the position shown in FIG. 4, the safety bolt 9 will be torn off.

Figure 5:
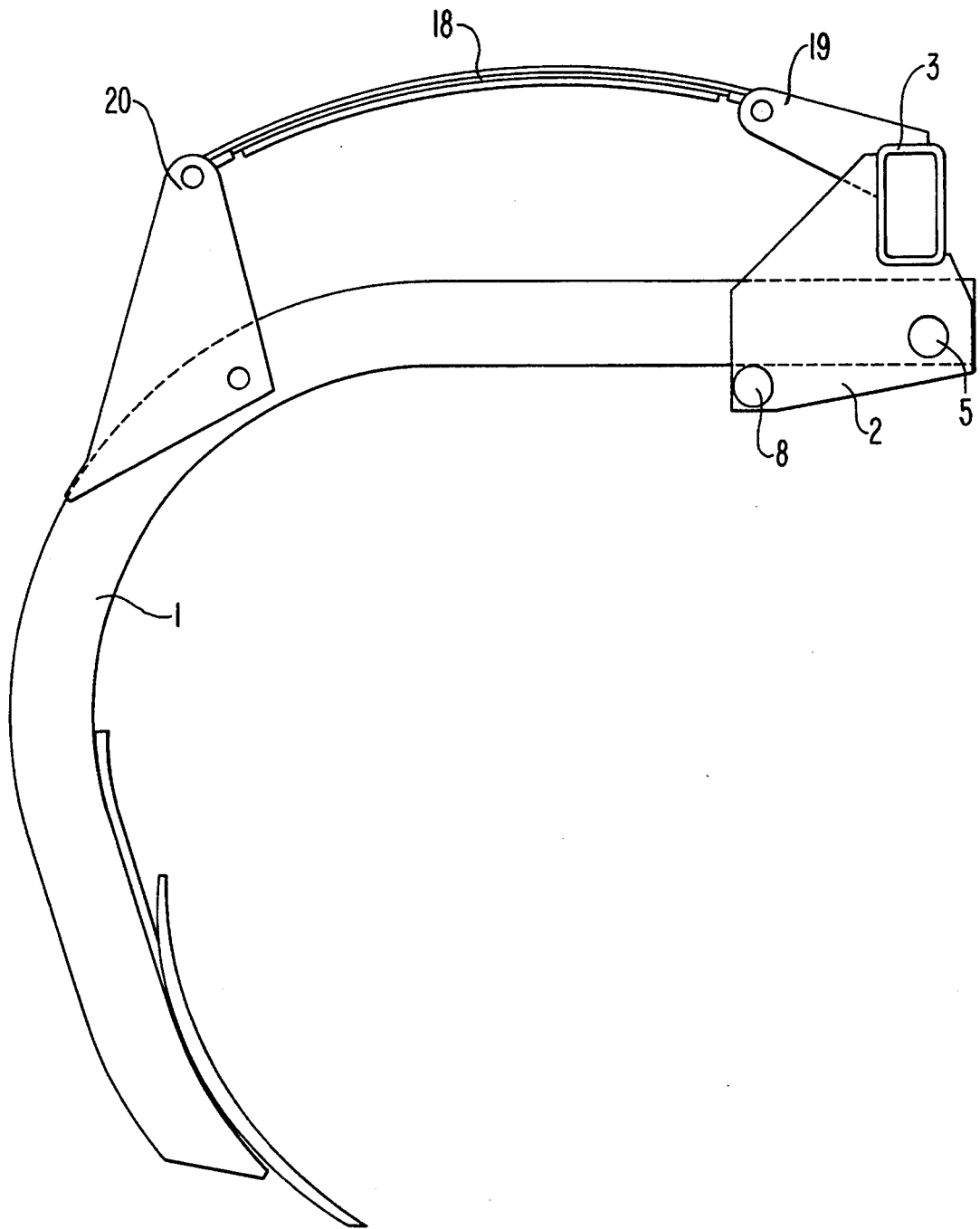
FIG. 5 shows, in a side elevational view, a third variant of a suspended grubber tine having a release device.

In the third embodiment, shown in FIG. 5, a spring 18, preferably a leaf spring, is mounted and biased between a first spring attachment 19 fastened to the frame 3, and a second spring attachment 20 fastened to the grubber tine 1, whereby the spring force maintains the grubber tine 1 in working position through urging the grubber tine 1 to rest against the shaft 8. Whenever an obstacle is met within the soil, a rotation of the grubber tine 1 of such a magnitude around the shaft 5 is allowed, permitting the grubber tine 1 to pass above the obstacle, simultaneously as the force from the spring 18 urges the grubber tine 1 back to a working position when the obstacle has been passed.

I claim:

1. A resilient grubber tine for working the soil, comprising:

a grubber tine (1) having a hollow cross-section,
a shaft,
a boss (4) having a contact surface, attached to the grubber tine (1) said boss (4) suspending the grubber tine (1) rotatably on said shaft (5),
a hole defined in a wall of the grubber tine, wherein the boss (4) is pressed into the hole in the wall of the grubber tine (1), whereby elastic material deformation of the contact surface attaches the boss (4) to the grubber tine (1) through friction,
a safety bolt (9) connected to said grubber tine, and having means for maintaining the grubber tine (1) in a working position, and to be torn off through tension upon the occurrence of a predetermined load on the grubber tine, in order to protect the grubber tine (1) against overload, and
a resilient member (16) with a working area, positioned between the safety bolt and the grubber tine, through which the force between the grubber tine (1) and the safety bolt (9) passes, whereby the grubber tine (1) may be rotated around the shaft (5) within the working area of the resilient member (16) when a load on the grubber tine varies.

2. A resilient grubber tine for working the soil, comprising:
a grubber tine (1) having a hollow cross-section,
a shaft,
a boss (4) having a contact surface, attached to the grubber tine (1), said boss (4) suspending the grubber tine (1) rotatably on said shaft (5), and
a hole defined in a wall of the grubber tine, wherein the boss (4) is pressed into the hole in the wall of the grubber tine (1), whereby elastic material deformation of the contact surface attaches the boss (4) to the grubber tine (1) through friction;
wherein the contact surface is conical.

3. A resilient grubber tine for working soil, comprising:
a hollow tine body comprising a plurality of walls,
a shaft, and
two opposing bosses of elastic material, the bosses engaging the tine body for suspending the tine body rotatably on the shaft,
wherein each boss is pressed into a separate hole in a wall of the tine body whereby the elastic material deformation of a contact surface of each boss separately attaches each boss to the tine body by friction.

4. A resilient grubber tine as set forth in claim 3, wherein the tine body is formed by a pipe that is square in cross-section.

5. A resilient grubber tine as set forth in claim 3, further comprising a spring (18) adapted to maintain the tine body in a working position, and having a sufficiently large working area in order to allow the tine body to rotate around the shaft (5) and escape obstacles in the soil, whereafter a spring force returns the grubber tine to the working position.

6. A resilient grubber tine as set forth in claim 3, further comprising a safety bolt connected to said hollow tine body, and having means for maintaining the tine body in a working position and further adapted to be torn off through tension upon the occurrence of a predetermined load on the tine body, and further comprising an intermediate resilient member transferring tension in the safety bolt to the tine body.

7. A resilient grubber tine as set forth in claim 6, wherein the resilient member has a working area, positioned between the safety bolt and the tine body, through which forces passes from the tine body to the safety bolt, and vice versa, wherein the tine body may rotate around the said shaft within said working area of the resilient member when a load on the tine body varies.

8. A resilient grubber tine as set forth in claim 3, wherein said contact surface between each boss and the tine body is conical.

9. A resilient grubber tine as set forth in claim 3, wherein the tine body is tubular.

* * * * *